United States Patent
Billau et al.

(10) Patent No.: US 9,628,962 B1
(45) Date of Patent: Apr. 18, 2017

(54) USING COMPUTED TRAVEL TIMES TO INTELLIGENTLY ATTENUATE BEACON TRANSMISSION

(71) Applicant: International Business Machines Corporation, Armonk, NY (US)

(72) Inventors: Michael R. Billau, Durham, NC (US); John K. Gerken, III, Apex, NC (US); Jeremy A. Greenberger, Raleigh, NC (US); Ciaran E. Hannigan, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/267,642

(22) Filed: Sep. 16, 2016

(51) Int. Cl.
*H04W 72/04* (2009.01)
*H04W 4/02* (2009.01)
*H04W 4/04* (2009.01)
*H04W 72/12* (2009.01)

(52) U.S. Cl.
CPC ........... *H04W 4/028* (2013.01); *H04W 4/043* (2013.01); *H04W 72/1263* (2013.01)

(58) Field of Classification Search
CPC .............................. H04W 72/042; H04W 4/02
USPC ..................................................... 455/456.1
See application file for complete search history.

(56) References Cited

U.S. PATENT DOCUMENTS

| | | | |
|---|---|---|---|
| 8,218,971 B2 | 7/2012 | Preston et al. | |
| 8,238,921 B2 | 8/2012 | Chang et al. | |
| 8,989,779 B1 | 3/2015 | Centore, III | |
| 9,071,938 B2 | 6/2015 | Vellanki et al. | |
| 9,294,961 B2 | 3/2016 | Meredith et al. | |
| 9,306,660 B2 | 4/2016 | Graube et al. | |
| 2013/0122902 A1* | 5/2013 | Ren | H04W 52/0216 455/434 |
| 2014/0223479 A1 | 8/2014 | Krishnamoorthi et al. | |
| 2015/0111599 A1* | 4/2015 | Yamasaki | G08G 1/0112 455/456.1 |
| 2015/0348146 A1 | 12/2015 | Shanmugam et al. | |
| 2016/0029164 A1 | 1/2016 | Attar et al. | |
| 2016/0048827 A1 | 2/2016 | Corbalis et al. | |
| 2016/0066159 A1 | 3/2016 | Cronin et al. | |
| 2016/0077187 A1 | 3/2016 | Sathish et al. | |

FOREIGN PATENT DOCUMENTS

WO 2014121294 A1 8/2014

OTHER PUBLICATIONS

Moors et al.; "ZoneIT: Using Short-Range Radios to Control Mobile Device Functionality", ICMB'05 IEEE/ACM International Conference On, Jul. 11-13, 2005, pp. 485-491.
Kim et al.; "Zone-Based Fairness Control in Multi-Channel Multirate High-Speed Networks", ICHIT'09 ACM Proceedings, Inter. Conf. On, Aug. 27-29, 2009, pp. 662-667.

(Continued)

*Primary Examiner* — Omoniyi Obayanju
(74) *Attorney, Agent, or Firm* — Brown & Michaels, PC; Maeve M. Carpenter

(57) ABSTRACT

Determining a beacon interval in which a device, located within a venue having a plurality of predefined zones, sends a beacon to a system for tracking the location of the device within the venue. Each of the predefined zones has a zone-specific beacon interval which is updated.

12 Claims, 6 Drawing Sheets

(56) References Cited

OTHER PUBLICATIONS

"Location Strategies", retrieved from https://developer.android.com/guide/topics/location/strategies.html, as early as Jun. 2012.
"Facebook Drains Your iPhone Battery Because Its Tracking Your Location: Report", retrieved from http://gadgets.ndtv.com/social-networking/news/facebook-drains-your-iphone-battery-because-its-tracking-your-location-report-753756, Oct. 2015.
"Balance ios battery life and location accuracy", retrieved from http://stackoverflow.com/questions/14205952/balance-os-battery-life-and-location-accuracy, as early as Jan. 2013.

* cited by examiner

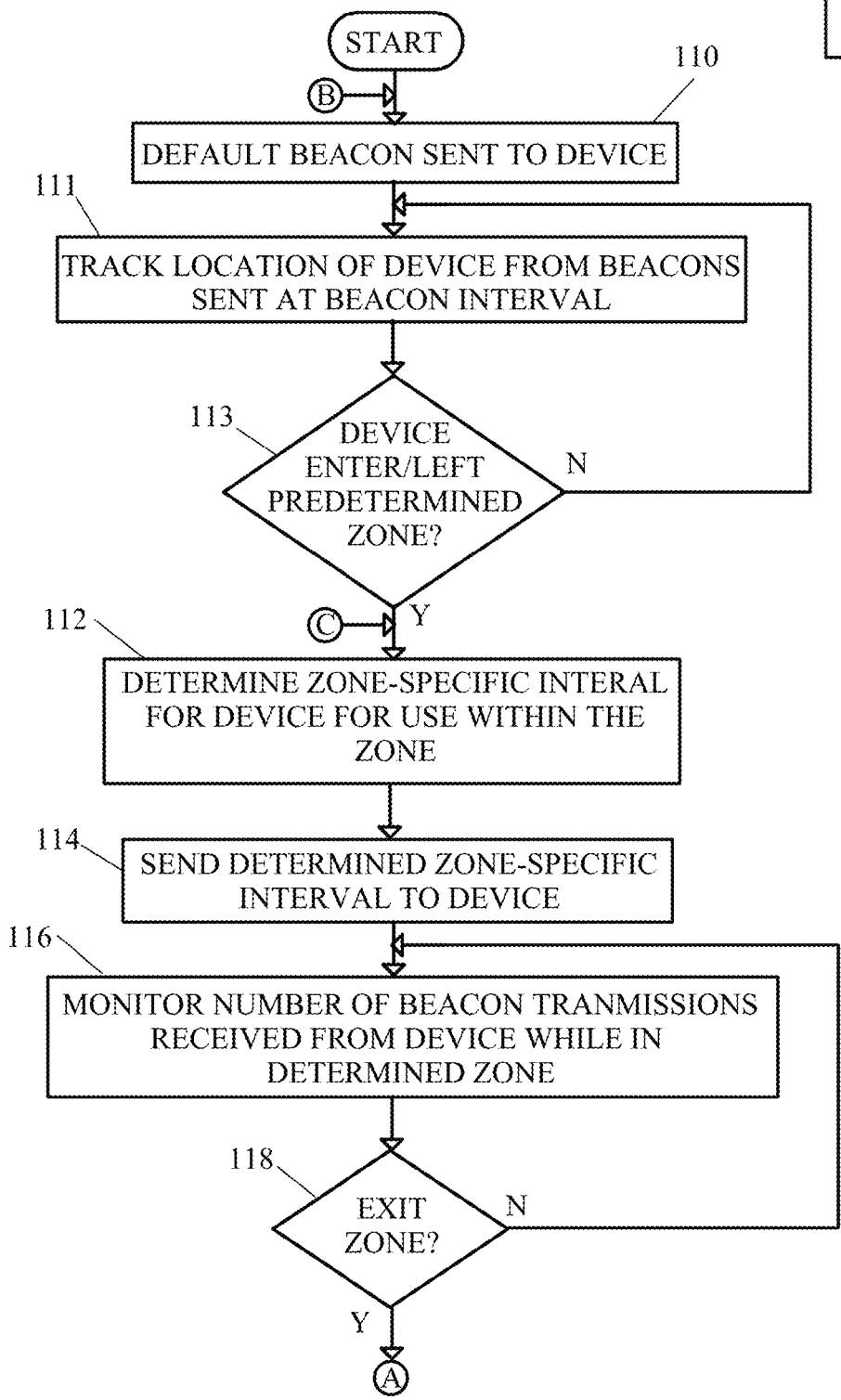

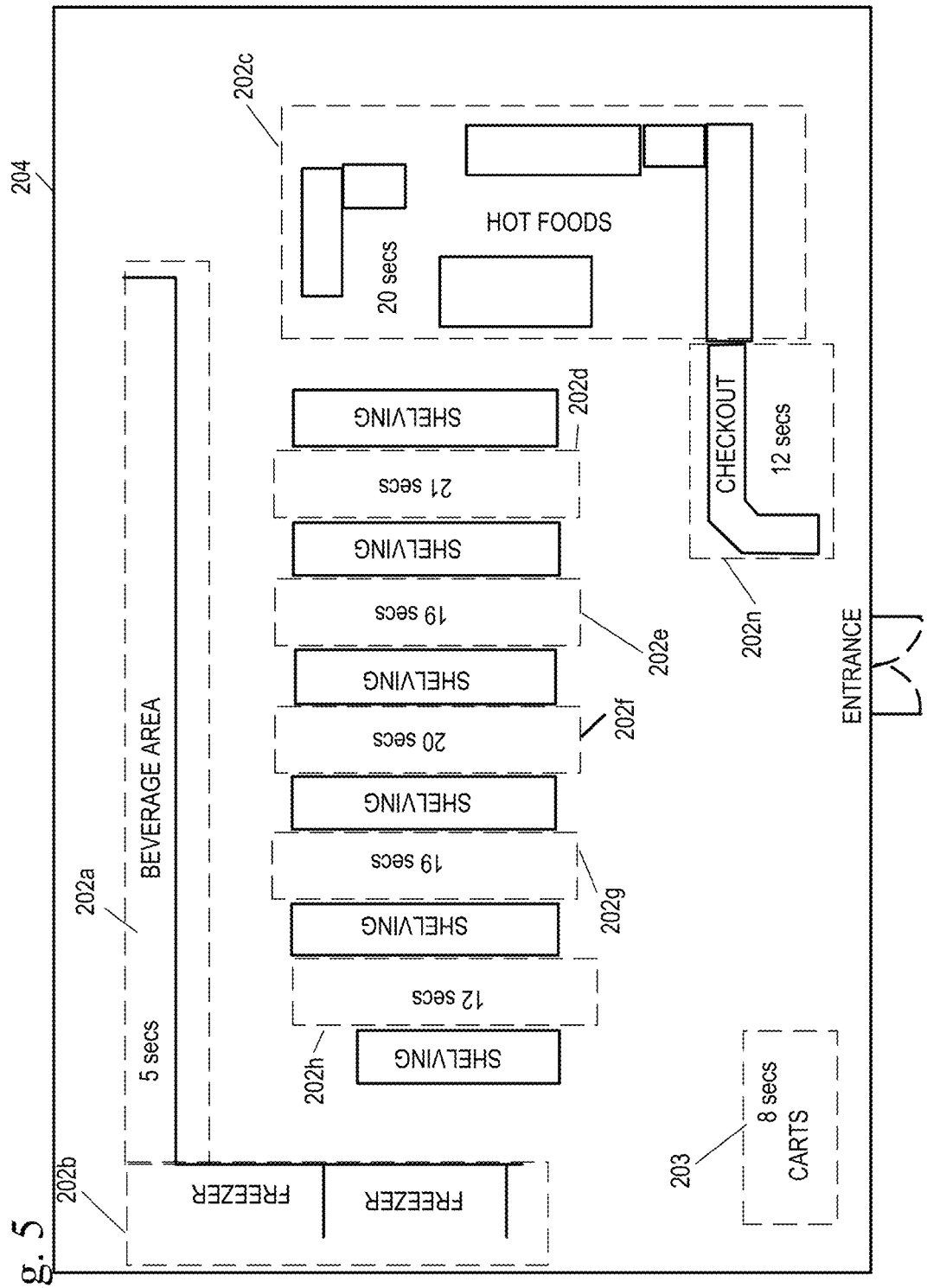

USING COMPUTED TRAVEL TIMES TO INTELLIGENTLY ATTENUATE BEACON TRANSMISSION

BACKGROUND

The present invention relates to transmission of data for service processing, and more specifically to using computed travel times to intelligently attenuate beacon transmission.

Location services require mobile devices to transmit data to a service for processing. Network bandwidth and battery life must be taken in consideration when creating an application that constantly transmits data.

SUMMARY

According to one embodiment of the present invention a method of determining a beacon interval in which a device located within a venue having a plurality of predefined zones sends a beacon transmission to a system for tracking the location of the device within the venue is disclosed. The method comprising the steps of: a) the system sending a default beacon interval to the device to be used as a beacon interval by the device; b) the system tracking a location of the device from the beacon transmissions which are sent by the device at the beacon interval to the system; c) if the system determines that the device has entered a predefined zone of the venue, and if the device has entered a predefined zone of the venue, the system: i) determining a zone-specific beacon interval for the device for use within the zone based on information from a repository; ii) sending the zone-specific beacon interval to the device for use within the zone; iii) repeating the method from step (b); d) if the system determines that the device is remaining in a predefined zone, the system monitoring a number of beacon transmissions from the device in the zone; and repeating the method from step (b); and e) if the system detects the device has exited a predefined zone, the system: i) updating the information in the repository from which the zone-specific beacon interval was determined in step (c)(i) from the number of beacon transmissions monitored in step (d); ii) if the system detects that the device has entered another predefined zone, repeating the method from step (c); otherwise repeating the method from step (a).

According to another embodiment of the present invention, a computer program product for determining a beacon interval in which a device located within a venue having a plurality of predefined zones sends a beacon transmission to a system for tracking the location of the device within the venue is disclosed. The system comprising a computer comprising at least one processor, one or more memories, one or more computer readable storage media, the computer program product comprising a computer readable storage medium having program instructions embodied therewith. The program instructions executable by the computer to perform a method comprising: a) sending, by the system a default beacon interval to the device to be used as a beacon interval by the device; b) tracking, by the system, a location of the device from the beacon transmissions which are sent by the device at the beacon interval to the system; c) if the system determines that the device has entered a predefined zone of the venue, and if the device has entered a predefined zone of the venue: i) determining, by the system, a zone-specific beacon interval for the device for use within the zone based on information from a repository; ii) sending, by the system, the zone-specific beacon interval to the device for use within the zone; iii) repeating the program instructions from step (b); d) if the system determines that the device is remaining in a predefined zone, monitoring, by the system, a number of beacon transmissions from the device in the zone; and repeating the program instructions from step (b); and e) if the system detects the device has exited a predefined zone: i) updating, by the system, the information in the repository from which the zone-specific beacon interval was determined in step (c)(i) from the number of beacon transmissions monitored in step (d); ii) if the system detects that the device has entered another predefined zone, repeating the program instructions from step (c); otherwise repeating the program instructions from step (a).

According to another embodiment of the present invention, a computer system for determining a beacon interval in which a device located within a venue having a plurality of predefined zones sends a beacon transmission to the computer system for tracking the location of the device within the venue is disclosed. The computer system comprising a computer comprising at least one processor, one or more memories, one or more computer readable storage media having program instructions executable by the computer to perform the program instructions comprising: a) sending, by the computer system a default beacon interval to the device to be used as a beacon interval by the device; b) tracking, by the computer system, a location of the device from the beacon transmissions which are sent by the device at the beacon interval to the system; c) if the computer system determines that the device has entered a predefined zone of the venue, and if the device has entered a predefined zone of the venue: i) determining, by the computer system, a zone-specific beacon interval for the device for use within the zone based on information from a repository; ii) sending, by the computer system, the zone-specific beacon interval to the device for use within the zone; iii) repeating the program instructions from step (b); d) if the computer system determines that the device is remaining in a predefined zone, monitoring, by the system, a number of beacon transmissions from the device in the zone; and repeating the program instructions from step (b); and e) if the computer system detects the device has exited a predefined zone: i) updating, by the computer system, the information in the repository from which the zone-specific beacon interval was determined in step (c)(i) from the number of beacon transmissions monitored in step (d); ii) if the computer system detects that the device has entered another predefined zone, repeating the program instructions from step (c); otherwise repeating the program instructions from step (a).

BRIEF DESCRIPTION OF THE SEVERAL VIEWS OF THE DRAWINGS

FIGS. 3A and 3B show a flow diagram of a method of determining data transmission rate of a zone at a venue.

FIG. 5 shows a schematic of a venue with multiple zones and the associated data transmission rates.

DETAILED DESCRIPTION

Figure 1:
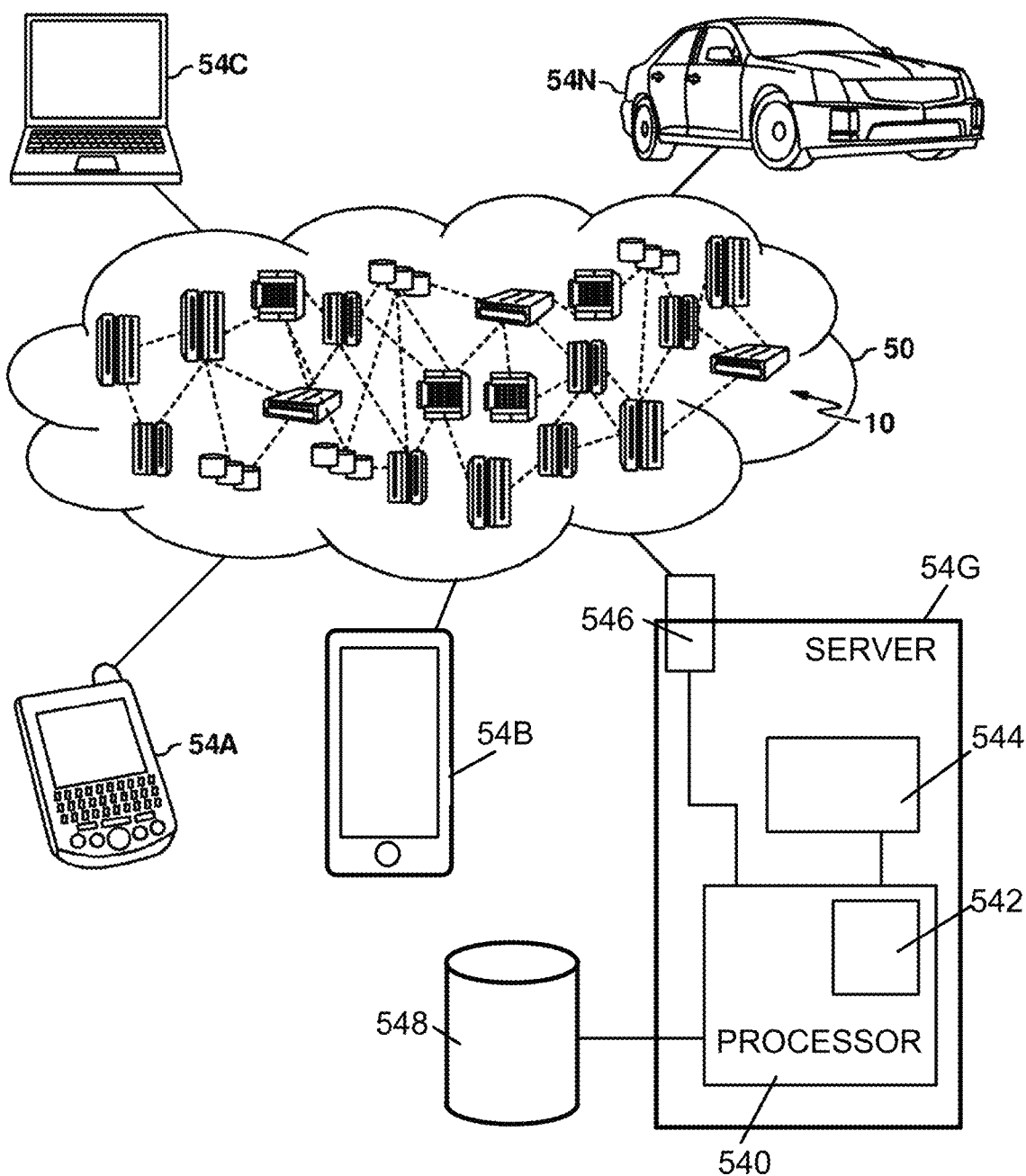
FIG. 1 depicts a cloud computing node according to an embodiment of the present invention.

Systems such as, for example, the IBM® Presence Insight system, enable venues associated with public spaces, healthcare, travel, stadiums, retail stores, and transportation businesses to extend customer service and support through mobile devices.

For example, a retail venue can use a system to transform the in-store customer experience by using intelligent location-based technology to engage patrons in near real-time to influence and increase sales. It also drives unique and personal interactions with patrons, such as personalized marketing promotions.

Integrating such systems with other systems designed to interact with on-site personnel can help a user adjust associate and staff coverage is based on patron traffic.

Systems such as IBM Presence Insights work by detecting mobile devices that are communicating through radio signals using various protocols, such as Bluetooth or Bluetooth Low Energy (BLE), Wi-Fi 802.11 on 2.4 GHz and 5 GHz radio communication protocols.

When a device is detected using one of the supported protocols, a Globally Unique Identifier (GUID) is assigned for the device. The GUID can be the MAC address for the device. The device is tracked as it moves through the venue. As the device moves through the venue, notifications can be triggered and sent enabling other back-office systems to take action.

The device owner's trajectory and movement behavior as it relates to defined site and zone regions can be determined and reported. The reports enable sophisticated analysis of the site's customer data, such as movement patterns, site traffic, and owner preferences. A system can analyze details such as, the average number of devices in a zone at any specified time, the average number of devices in the site at any specified time, how long the devices are staying in a particular zone at any specified time, etc.

This kind of system requires that the devices communicate with the system on a regular basis, to enable tracking the device's location within the venue, in a process called "location services". For the purposes of this description, such communications, regardless of actual content, will be called "beacon transmissions", and the time between successive beacon transmissions will be called the "beacon interval". This communication consumes network resources and battery energy, so the smaller the beacon interval, and thus the more often the device transmits, the more energy it uses and the more network traffic it creates.

Currently, the beacon interval is set by the venue owner for use in the entire venue, so as a user moves around the venue, the device sends its location services data ("beacon transmissions") at a fixed rate of, say, once every six or nine seconds (i.e. the beacon interval is 6-9 seconds).

It is known that a user does not always move at a consistent rate throughout a venue. For example, if the venue is a supermarket, the user might be expected to move quickly through the entrance area and along main aisles where there is little to interest them, and more slowly down the individual food aisles where they might be searching for a particular food item or reading labels. An area like the deli or hot food area, where the customer might be waiting for service from a clerk, would involve even longer waits ("dwell time"), while in a beverage cooler area it would require only a short time for the consumer to open a door, make a selection, and move on.

If a consumer's dwell time in an area is long, the system's location service does not need to hear from the consumer's device very often to determine that the consumer is still in the area. Conversely, if the dwell time in an area is short, more frequent beacon transmissions are required to accurately track the consumer's location.

If the beacon interval is too long, the system might miss a customer's presence in an area entirely. If the beacon interval is too short, the consumer's device's battery might be run down prematurely and/or the venue's network might be overloaded.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models It is to be understood that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Characteristics are defined as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are defined as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are defined as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustrative cloud computing environment 50 is depicted. As shown, cloud computing environment 50 includes one or more cloud computing nodes 10 with which mobile computing devices used by cloud consumers, such as, for example, personal digital assistant (PDA) 54A or cellular telephone 54B, a tablet or laptop computer 54C, and/or automobile computer system 54N may communicate. A computer server 54G, can communicate with the mobile computing devices 54A, 54B, 54C, 54N, as will be described below. The server 54G has a processor 540 with one or more memories 542 and computer readable storage media 544 having program instructions executable by the processor, a network interface 546 for connection to the cloud 50, and a repository 548 for data. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
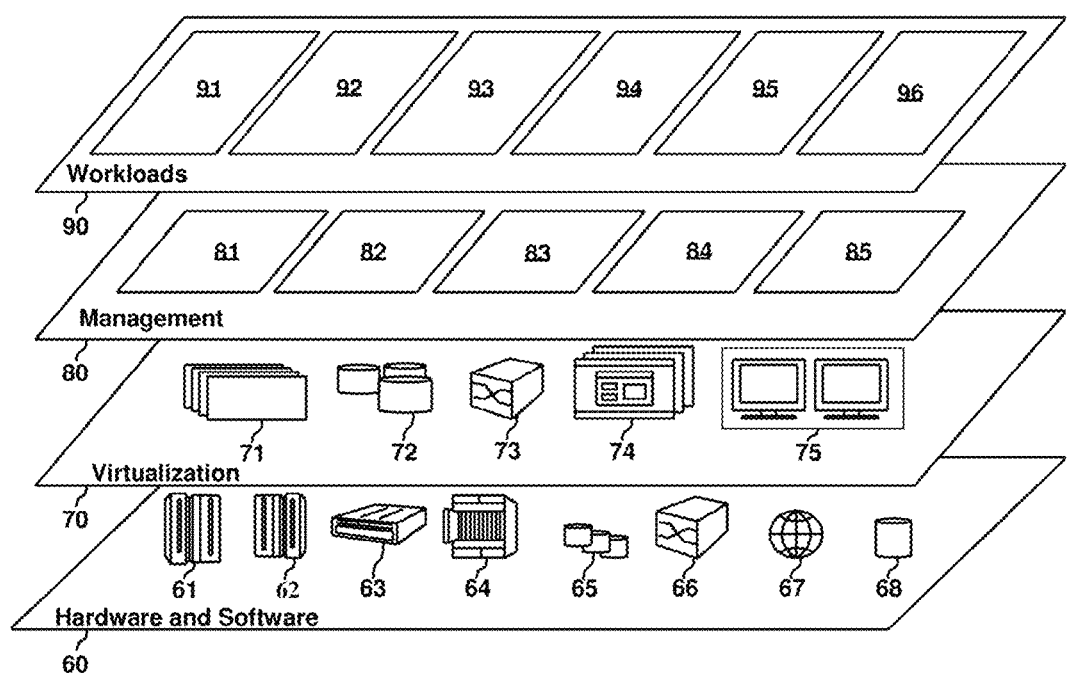
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and attenuated transmission frequency 96.

Figure 3B:
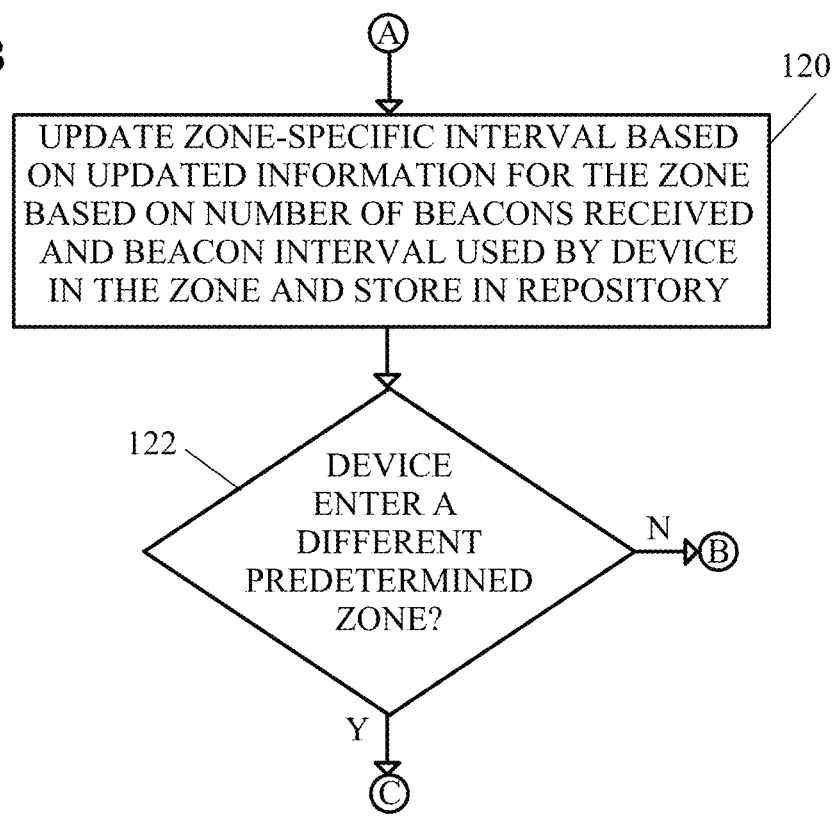

FIGS. 3A and 3B show a flow diagram of a method of determining how often a device should send a beacon transmission (hereinafter, the "beacon interval") within a plurality of predefined zones within a venue. Preliminarily, a default beacon interval for a venue is determined, which sets a beacon interval for a device which is located within the venue, but outside of any of the predefined zones, to an average value appropriate throughout the venue. Also, a plurality of zones are defined throughout the venue where it might be expected that a user might spend more or less time than that expected on average throughout the venue.

In a first step (step 110), the system sends a default beacon interval to the device. This will be done when the device first enters the venue, and whenever it leaves a predefined zone without entering another predefined zone.

The system tracks the device's location from the beacon transmissions which are sent by the device at the beacon interval (step 111).

If the location of the device with respect to the predefined zones has not changed (i.e. it has not left or entered a predefined zone), (step 113) the method continues to track the location of the device (step 111).

When a device enters a predefined zone, the system determines a zone-specific beacon interval for the device for use within the zone, for example by looking up the zone in a repository (step 112). The repository may store an actual beacon interval, for example, or it might store an expected dwell time or range of dwell times for the zone. If the repository stores an expected dwell time, the zone-specific beacon interval can be determined by from the expected dwell time and a desired minimum number of beacon transmissions the system expects from a device during its residence in a zone.

The zone-specific beacon interval from the prior step is sent to the device (step 114).

While the device is in the zone, the number of beacon transmissions received from the device is monitored (step 116). Additionally, the signal strength of the beacon transmission from the specific zone as well as beacon transmissions that may be close to an edge of the zone but are in another zone may also be monitored for.

When the system detects that device exits the zone (i.e. a beacon transmission for the device is received from a different zone), (step 118) the information in the repository for the zone is updated based on the number of beacon transmissions received and the beacon interval used by the device when it was in the zone. The updated information used for determining the zone-specific beacon interval is stored, for example in the repository, for use with the next device to enter the zone (step 120). An example of a method of updating the zone-specific beacon interval may be found in the flowchart of FIG. 4, discussed in more detail below.

If the device has not entered a predefined zone when it leaves the previous zone (step 122), then the system returns to step 110 of sending the default beacon interval to the device. If the device has entered a different predefined zone, the method returns to step 112 of determining a new zone-specific beacon interval.

Figure 4:
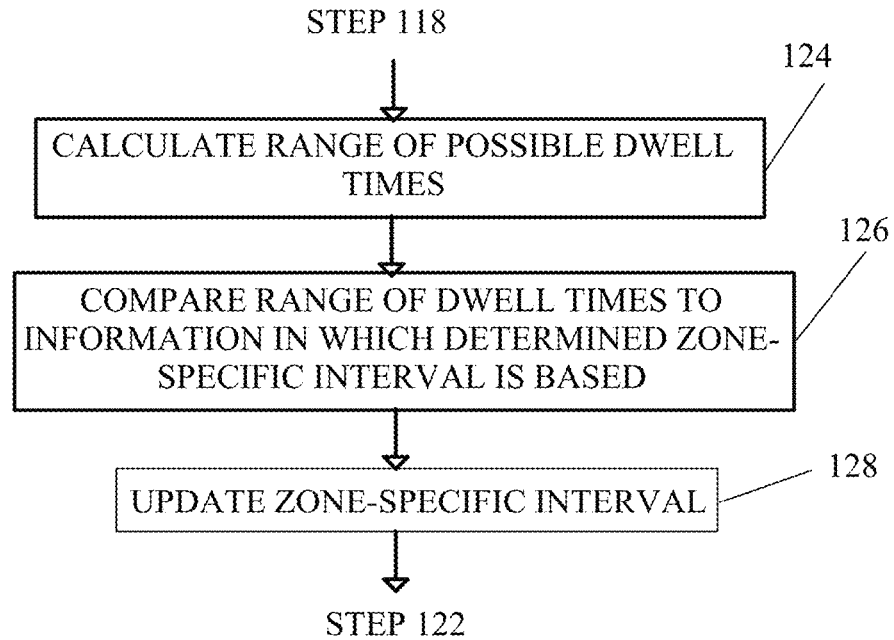
FIG. 4 shows a flow diagram of a method of updating a default data transmission for one or more zones based on monitoring.

FIG. 4 shows a flow diagram of an example of a method of updating a zone-specific beacon interval for a zone based on data derived from monitoring devices within the zone (step 120).

The updating of the zone-specific beacon interval may use data derived from a system which aggregates location and location-related metadata to build context that may be used for analysis and resulting actions. An example of a system which can aggregate location and location-related metadata may be IBM's MobileFirst Platform Presence Insights.

The number of beacon transmissions made by the device while in the zone, from the data accumulated in step 116, and the beacon interval sent to the device while in the zone from step 114, can be used to calculate a range of possible dwell times within the zone (step 124). Optionally, the signal strength of the beacon transmission made by the device may be sent from the data accumulated in step 116.

For example, if the zone-specific beacon interval sent to the device in step 114 was 20 seconds, and two beacon transmissions were received from the device before the system detected that it had entered a different zone, the dwell time in the zone could be in the range of 20-60 seconds (20 seconds if the first beacon transmission was sent as soon as the device entered the zone, and the second beacon transmission was sent just as it left, or 60 seconds if the device sent both beacon transmissions while in the zone, but the beacon transmission which indicated that the device had entered a different zone was sent at the end of the interval, just after it left the zone).

The information from step 124 is compared to the information as stored in the repository (step 126) to update the information in the repository which is used in step 114 to determine the zone-specific beacon interval (step 128).

If the signal strength of the beacon transmission was also received in the data accumulated, the signal strength may be compared to information in the repository to determine whether the beacon transmission belongs in the zone in which the device is being identified as being in or another zone which may be adjacent, to eliminate any incorrect data associated with a zone.

For example, suppose that it has been determined that the system should receive at least three beacon transmissions when a device is in a zone, in order to accurately place the device as it moves around the venue. The data from step 116 indicates that six beacon transmissions were received from the device. This would indicate either that the actual dwell time of the device in the zone was longer than was expected, or the beacon interval sent to the device in step 114 was too short. Therefore, the information in the repository will need to be updated to account for this discrepancy. Exactly how this is done will depend on what information is stored in the repository.

For example, suppose the repository stores an estimated dwell time of 30 seconds in the zone, and, as noted above, it is desired to receive at least three beacon transmissions while the device is in the zone. The device has sent six beacons at a beacon interval of 10 seconds. This would indicate that the device actually spent 50-70 seconds in the zone. The estimated dwell time in the repository should be adjusted upward. This can be done, for example, by increasing the dwell time by half of the difference between the stored dwell time for the zone and the average computed dwell time for the device—in this case, that would mean adding 15 seconds (one half of the average (50+70/2) minus the stored value of 30 seconds) to the stored value, making the new updated value 45 seconds. Thus, when the zone-specific beacon interval is determined in step 112, the system would take the dwell time of 45 seconds and divide by 3 (the expected number of beacon transmissions) and determine a zone-specific beacon interval of 15 seconds.

Or, for example, suppose the repository stored the zone-specific beacon interval directly, and, as noted above, it is desired to receive at least three beacon transmissions while the device is in the zone. The device has sent six beacons at the previously stored beacon interval of 10 seconds. This would indicate that the stored beacon interval is too short, and should be adjusted upwards. This can be done, for example, by multiplying the stored zone-specific beacon interval by a factor of, for example, one half of one plus the ratio of the actual number of beacons received divided by the desired number of beacons—in this case, that would be (1+(6/3))/2=1.5. Therefore, the updated zone-specific beacon interval stored in the repository would be 10 seconds*1.5=15 seconds.

It will be understood that the examples described above adjust the data stored in the repository by only a portion of the difference between the expected and actual values, in order to minimize the effect of any one consumer. In addition, the system might ignore outlier values—for example, if the dwell time were exceedingly high because the consumer stopped to chat with a friend, or exceedingly low because the consumer was just racing down one aisle on her way to another.

Other variations on the method of updating the repository, and other factors which might be stored in the repository, are possible within the teachings of the invention.

FIG. 5 shows a schematic of a venue with multiple zones and the associated zone-specific beacon intervals which might be used in the zones.

For example in a venue 204 such as a supermarket, multiple zones 202a-202n may be present in different physical locations within the venue, for example between shelving or in specific areas of the supermarket. Each of the zones 202a-202n has a calculated zone-specific beacon interval for devices present within the zones. Areas not included within a zone, for example the cart area 203 may have a default beacon interval of 8 seconds as indicated.

Zones which are physically larger or which a dwell time of a device is longer than a threshold, have a longer zone-specific beacon interval and other zones which have a small dwell time will have a shorter zone-specific beacon interval. For example in the hot-food department 202c the zone-specific beacon interval is 20 seconds, since consumers will spend more time in that department waiting to be served, than in other self-serve departments. The cold beverage area 202a has a zone-specific beacon interval of only 5 seconds since consumers would be expected to spend only a short time picking out beverages.

It will also be recognized that the method of the present invention does not restrict the flow of cellular traffic or other data transmissions the user might choose to make, but may regulate the transmission interval of beacon transmissions used for determining the location of the device.

It will also be recognized that the method of the present invention can reduce overhead for both the mobile device and the server, saving the venue operator money due to a decreased amount of network traffic. Additionally, due to the lower transmission amounts, battery life of the device may be optimized.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining a beacon interval for a device located within a venue having a plurality of predefined zones, in which the device sends a plurality of beacon transmissions to a system for tracking the location of the device within the venue, the plurality of beacon transmissions being sent at a beacon interval, comprising the steps of:
   a) the system sending a default beacon interval to the device to be used as a beacon interval by the device;
   b) the system tracking a location of the device from the beacon transmissions received by the system which are sent by the device at the beacon interval;
   c) if the system determines that the device has entered a predefined zone of the venue, the system:
      i) determining a zone-specific beacon interval for the device for use within the zone based on information from a repository;
      ii) sending the zone-specific beacon interval to the device for use within the zone; and
      iii) repeating the method from step (b);
   d) if the system determines that the device is remaining in a predefined zone, the system monitoring a number of beacon transmissions from the device in the zone; and repeating the method from step (b); and
   e) if the system detects the device has exited a predefined zone, the system:
      i) updating the information in the repository from which the zone-specific beacon interval was determined in step (c)(i) from the number of beacon transmissions monitored in step (d);
      ii) if the system detects that the device has entered another predefined zone, repeating the method from step (c); otherwise repeating the method from step (a);
   wherein the information in the repository is updated in step (e)(i) by the steps of:
      the system calculating a range of possible dwell times within the zone for the device based on the number of beacon transmissions made by the device and the beacon interval used by the device;
      the system comparing the range of possible dwell times within the zone for the device to the zone-specific beacon interval; and
      the system recalculating the zone-specific beacon interval based on the comparison.

2. The method of claim 1, wherein the information in the repository in step (c)(i) is a stored beacon interval for the zone.

3. The method of claim 1, wherein the information in the repository is updated in step (e)(i) further by the step of: adjusting the zone-specific beacon interval for a zone stored in the repository by only a portion of a difference between an expected number of beacon transmissions based on the zone-specific beacon interval and an actual number of beacon transmissions within the zone.

4. The method of claim 1, wherein the information in the repository in step (c)(i) is an expected dwell time and a desired minimum number of beacons to be received by the system from the device while the device is located in the zone.

5. A computer program product for determining a beacon interval for a device located within a venue having a plurality of predefined zones, in which the device sends a plurality of beacon transmissions to a system for tracking the location of the device within the venue, the plurality of beacon transmissions being sent at a beacon interval, the system comprising a computer comprising at least one processor, one or more memories, one or more computer readable storage media, the computer program product comprising a computer readable storage medium having program instructions embodied therewith, the program instructions executable by the computer to perform a method comprising:
   a) sending, by the system, a default beacon interval to the device to be used as a beacon interval by the device;
   b) tracking, by the system, a location of the device from the beacon transmissions received by the system which are sent by the device at the beacon interval;
   c) if the system determines that the device has entered a predefined zone of the venue, and if the device has entered a predefined zone of the venue:
      i) determining, by the system, a zone-specific beacon interval for the device for use within the zone based on information from a repository;
      ii) sending, by the system, the zone-specific beacon interval to the device for use within the zone; and
      iii) repeating the program instructions from step (b);
   d) if the system determines that the device is remaining in a predefined zone, monitoring, by the system, a number of beacon transmissions from the device in the zone; and repeating the program instructions from step (b); and
   e) if the system detects the device has exited a predefined zone:
      i) updating, by the system, the information in the repository from which the zone-specific beacon interval was determined in step (c)(i) from the number of beacon transmissions monitored in step (d);
      ii) if the system detects that the device has entered another predefined zone, repeating the program instructions from step (c); otherwise repeating the program instructions from step (a);
   wherein the information in the repository is updated in step (e)(i) by program instructions executable by the computer to perform the steps of:

calculating, by the system, a range of possible dwell times within the zone for the device based on the number of beacon transmissions made by the device and the beacon interval used by the device;

comparing, by the system, the range of possible dwell times within the zone for the device to the zone-specific beacon interval; and recalculating, by the system, the zone-specific beacon interval based on the comparison.

6. The computer program product of claim 5, wherein the information in the repository in step (c)(i) is a stored beacon interval in for the zone.

7. The computer program product of claim 5, wherein the information in the repository is updated in step (e)(i) further by the program instructions executable by the computer to perform the steps of: adjusting, by the system, the zone-specific beacon interval for a zone stored in the repository by only a portion of a difference between an expected number of beacon transmissions based on the zone-specific beacon interval and an actual number of beacon transmissions within the zone.

8. The computer program product of claim 5, wherein the information in the repository in step (c)(i) is an expected dwell time and a desired minimum number of beacon transmissions to be received by the system from the device while the device is located in the zone.

9. A computer system for determining a beacon interval for a device located within a venue having a plurality of predefined zones, in which the device sends a plurality of beacon transmissions to a system for tracking the location of the device within the venue, the plurality of beacon transmissions being sent at a beacon interval, the computer system comprising a computer comprising at least one processor, one or more memories, one or more computer readable storage media having program instructions executable by the computer to perform the program instructions comprising:

a) sending, by the system, a default beacon interval to the device to be used as a beacon interval by the device;

b) tracking, by the system, a location of the device from the beacon transmissions received by the system which are sent by the device at the beacon interval;

c) if the system determines that the device has entered a predefined zone of the venue, and if the device has entered a predefined zone of the venue:

i) determining, by the system, a zone-specific beacon interval for the device for use within the zone based on information from a repository;

ii) sending, by the system, the zone-specific beacon interval to the device for use within the zone; and iii) repeating the program instructions from step (b);

d) if the system determines that the device is remaining in a predefined zone, monitoring, by the system, a number of beacon transmissions from the device in the zone; and repeating the program instructions from step (b); and e) if the system detects the device has exited a predefined zone:

i) updating, by the system, the information in the repository from which the zone-specific beacon interval was determined in step (c)(i) from the number of beacon transmissions monitored in step (d);

ii) if the system detects that the device has entered another predefined zone, repeating the program instructions from step (c); otherwise repeating the program instructions from step (a);

wherein the information in the repository is updated in step (e)(i) by program instructions executable by the computer to perform the steps of:

calculating, by the system, a range of possible dwell times within the zone for the device based on the number of beacon transmissions made by the device and the beacon interval used by the device;

comparing, by the system, the range of possible dwell times within the zone for the device to the zone-specific beacon interval; and recalculating, by the system, the zone-specific beacon interval based on the comparison.

10. The computer system of claim 9, wherein the information in the repository in step (c)(i) is a stored beacon interval in for the zone.

11. The computer system of claim 9, wherein the information in the repository is updated in step (e)(i) by program instructions executable by the computer to perform the steps of: adjusting, by the computer system, the zone-specific beacon interval for a zone stored in the repository by only a portion of a difference between an expected number of beacon transmissions based on the zone-specific beacon interval and an actual number of beacon transmissions within the zone.

12. The computer system of claim 9, wherein the information in the repository in step (c)(i) is an expected dwell time and a desired minimum number of beacons to be received by the system from the device while the device is located in the zone.

* * * * *